(12) United States Patent
Brett

(10) Patent No.: US 8,922,978 B2
(45) Date of Patent: Dec. 30, 2014

(54) ELECTRICAL HOUSINGS FOR AIRCRAFT

(75) Inventor: John Brett, Cheltenham (GB)

(73) Assignee: GE Aviation Systems Limited (GB)

( * ) Notice: Subject to any disclaimer, the term of this patent is extended or adjusted under 35 U.S.C. 154(b) by 155 days.

(21) Appl. No.: 13/358,856

(22) Filed: Jan. 26, 2012

(65) Prior Publication Data
US 2012/0188686 A1 Jul. 26, 2012

(30) Foreign Application Priority Data
Jan. 26, 2011 (GB) .................................. 1101344.8

(51) Int. Cl.
*H02B 1/26* (2006.01)
*H02B 1/40* (2006.01)
*H02B 1/20* (2006.01)

(52) U.S. Cl.
CPC ... *H02B 1/40* (2013.01); *H02B 1/20* (2013.01)
USPC ........................... 361/624; 361/622; 174/99 B

(58) Field of Classification Search
USPC ........................... 361/622, 624; 174/99 B, 377
See application file for complete search history.

(56) References Cited

U.S. PATENT DOCUMENTS

| | | | | | |
|---|---|---|---|---|---|
| 2,997,627 | A | * | 8/1961 | Ellegood ........................ | 361/614 |
| 3,555,293 | A | * | 1/1971 | Shannon et al. ............... | 307/147 |
| 5,949,641 | A | * | 9/1999 | Walker et al. .................. | 361/600 |
| 6,971,650 | B2 | * | 12/2005 | Marelja ........................ | 296/181.1 |
| 8,619,411 | B2 | * | 12/2013 | Rodrigues et al. ............. | 361/611 |
| 8,730,651 | B2 | * | 5/2014 | Rusch et al. ................... | 361/634 |
| 2004/0201967 | A1 | | 10/2004 | Muirhead et al. | |
| 2006/0120026 | A1 | * | 6/2006 | Wiant et al. .................... | 361/614 |
| 2009/0178821 | A1 | | 7/2009 | Zavidniak et al. | |
| 2009/0178824 | A1 | | 7/2009 | Burguera | |

FOREIGN PATENT DOCUMENTS

| | | | | |
|---|---|---|---|---|
| GB | 1363577 A | * | 8/1974 | ............... H02G 5/06 |
| GB | 2355593 A | | 4/2001 | |
| WO | WO 2004059810 A2 | * | 7/2004 | ............... H02G 5/00 |

OTHER PUBLICATIONS

Search Report and Written Opinion for corresponding French Appliction No. 1250715, dated Dec. 18, 2012.
GB Search Report dated Apr. 15, 2011 which was issued in connection with GB Application No. 1101344.8 which was filed on Jan. 26, 2011.

* cited by examiner

*Primary Examiner* — Robert J Hoffberg
(74) *Attorney, Agent, or Firm* — GE Global Patent Operation; Mark A. Conklin

(57) ABSTRACT

One aspect of the present invention provides a housing for housing electrical equipment in an aircraft. The housing comprises one or more panels defining an enclosed space for housing electrical equipment in an aircraft. The housing also comprises at least one electrical busbar for providing electric power to the electrical equipment, wherein the at least one electrical busbar is configured to provide structural support for the housing.

9 Claims, 3 Drawing Sheets

ELECTRICAL HOUSINGS FOR AIRCRAFT

BACKGROUND OF THE INVENTION

1. Field of the Invention

Embodiments of the present invention relate generally to electrical housings for aircraft. More particularly, embodiments of the present invention relate to a housing for housing electrical equipment in an aircraft in which an electrical busbar is used to provide power to the electrical equipment.

2. Description of the Prior Art

Electrical housings for protecting power distribution systems from environmental contamination and for protecting persons from electrocution are known generally. Some such systems may use composite materials, e.g. made from fiber-composite material and reinforcing glass fibers, to provide insulating parts. Moreover, it is also known to use composite materials to provide whole housings for various power distribution equipment.

However while numerous housings for housing domestic electrical equipment are known, the provision of housings for use in aircraft imposes strict technical requirements for such housings, particularly when they are used to house primary power distribution equipment (for example, of the type that provides a three-phase 415 volt supply). Such technical requirements may be imposed by various aviation authorities and/or be desirable from a manufacturing point-of-view.

For example, conventional housings that meet various aviation authority insulation, screening, vibration, impact, fire-safety, cooling regulatory requirements, etc. may be heavy because of extra structural support that is needed to produce such a housing.

Clearly, a reduction of weight for a housing for housing electrical equipment in an aircraft would thus be desirable.

BRIEF SUMMARY OF THE INVENTION

Embodiments of the present invention have therefore been devised while bearing the above-mentioned drawbacks associated with housings for electrical equipment when used for aircraft in mind.

According to an aspect of the present invention, there is provided a housing for housing electrical equipment in an aircraft. The housing comprises one or more panels defining an enclosed space for housing electrical equipment. The housing also comprises at least one electrical busbar for providing electric power to the electrical equipment, wherein the at least one electrical busbar is configured to provide structural support for the housing.

By providing a housing in which the busbar itself provides structural support for the housing, various aspects and embodiments of the present invention enable a reduced weight electrical housing to be provided in an aircraft. Moreover, such housings can also be more easily and quickly manufactured than conventional housings as they may require less need for the use of bolts, rivets, etc. during the manufacturing and assembly process.

BRIEF DESCRIPTION OF THE DRAWINGS

Various aspects and embodiments of the present invention will now be described in connection with the accompanying drawings, in which.

DETAILED DESCRIPTION OF THE INVENTION

Figure 1:
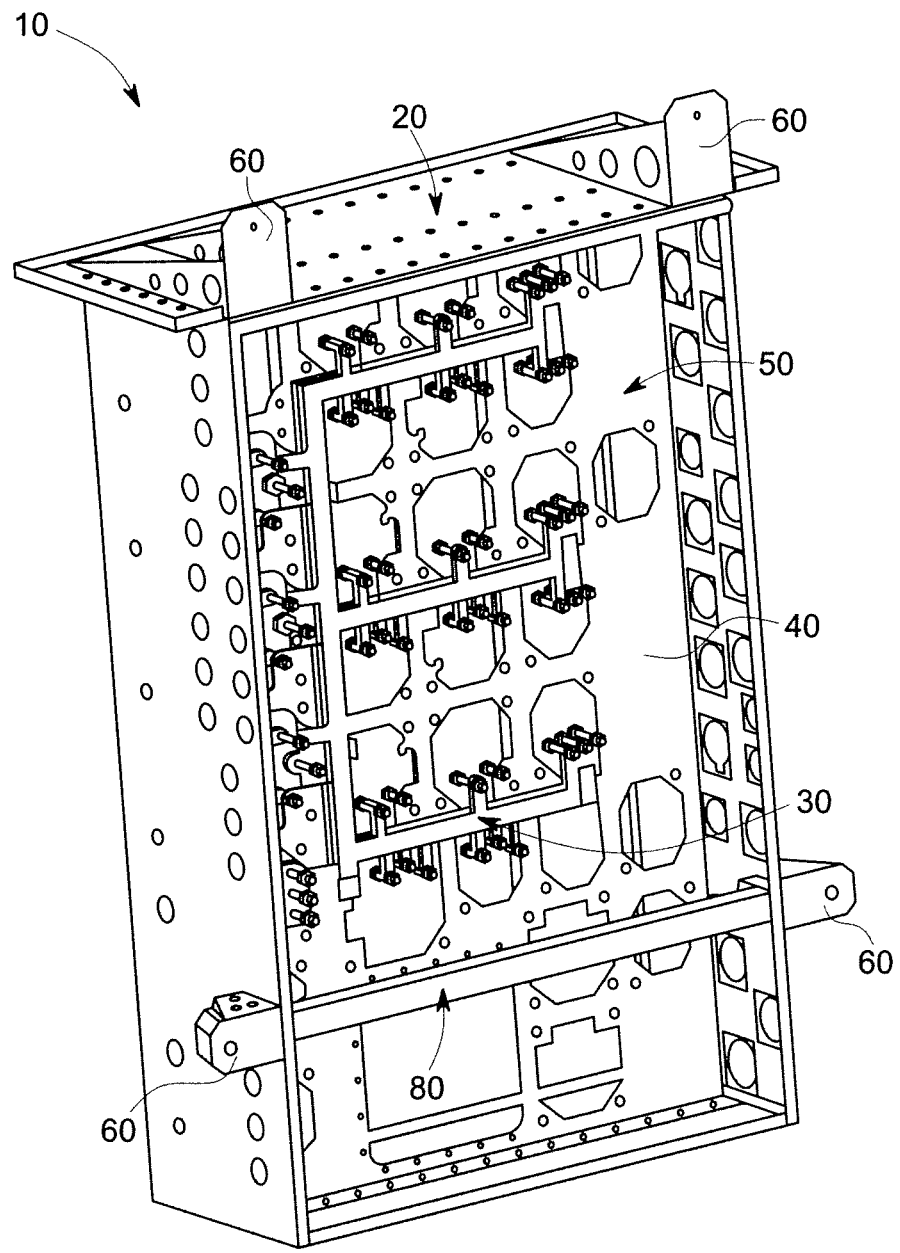
FIG. 1 shows a rear-view of a conventional aircraft electrical housing.

FIG. 1 shows a rear-view of a conventional aircraft electrical housing 10. The electrical housing 10 comprises an aluminium enclosure 20 defining an enclosed space 50. An aluminium backing plate 40 is affixed to the enclosure 20 and supports copper, substantially E-shaped, busbars 30. The busbars 30 are electrically connected to an external power supply unit (not shown) and are used to provide electrical power to electrical components (not shown) that are housed within the enclosed space 50.

The electrical components may also be mounted to the backing plate 40, which additionally provides mechanical support for the aircraft electrical housing 10. Further mechanical support for the aircraft electrical housing 10 is provided by a transversely-orientated reinforcing bar 80. The aircraft electrical housing 10 additionally comprises four mounting brackets 60 for fixing the assembled aircraft electrical housing 10 to an aircraft fuselage (not shown).

Figure 2:
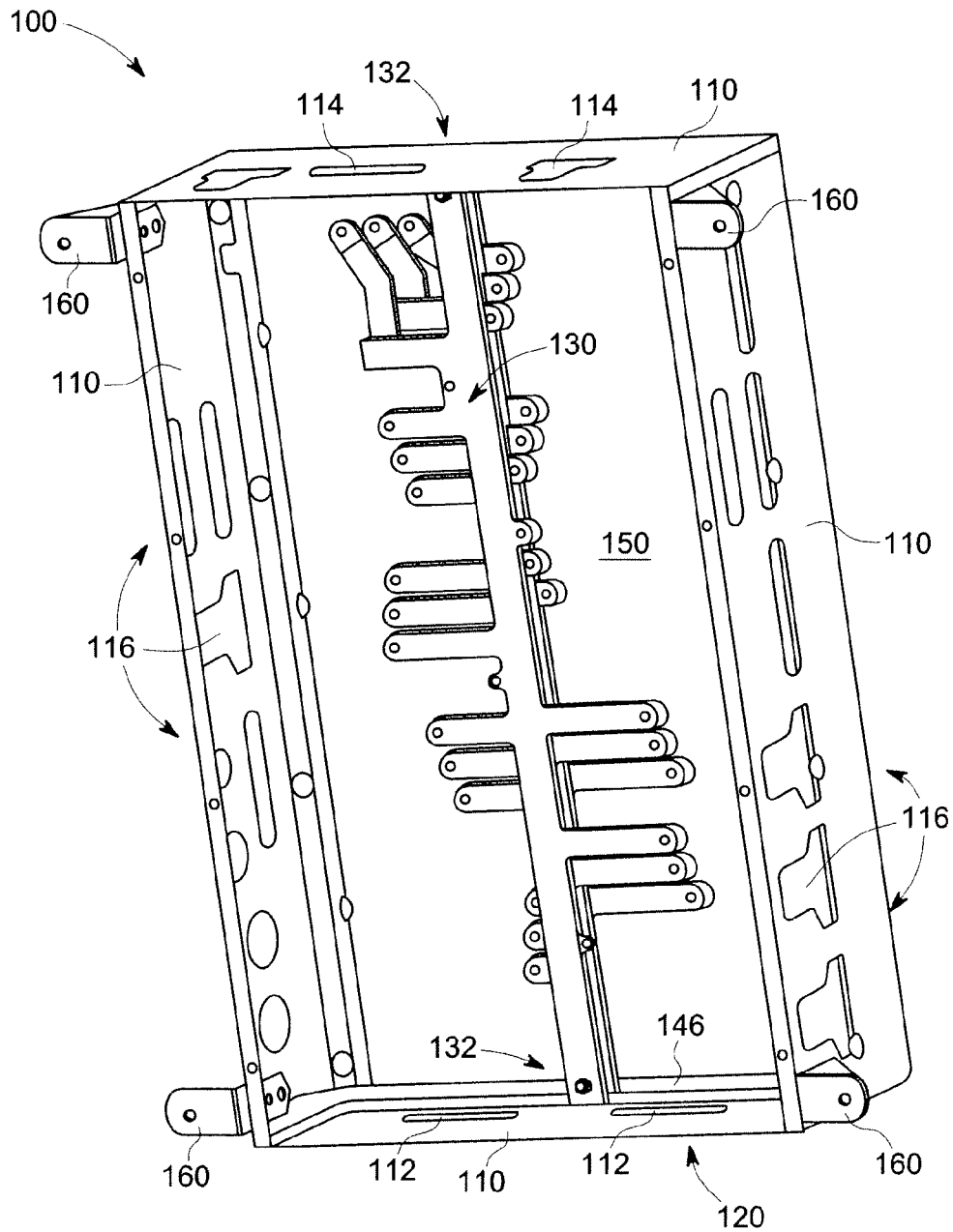
FIG. 2 shows a rear-view of a housing for housing electrical equipment in an aircraft according to an embodiment of the present invention.

FIG. 2 shows a rear-view of a housing 100 for housing electrical equipment in an aircraft according to an embodiment of the present invention. The housing 100 includes four panels 110, provided as respective opposing parallel pairs of panels 110, that together define an enclosed space 150 having a substantially rectangular cross-sectional shape. An additional front panel (not shown) may also be provided so as to prevent access to the enclosed space 150 once the housing 100 is installed in an aircraft.

Various electrical equipment, such as, for example, high-power electro-mechanical switches (not shown) may be housed within the enclosed space 150. Such electrical equipment may, for example, be mounted onto an optionally provided backing plate (not shown).

An aluminium busbar 130 is also provided within the enclosed space 150. The busbar 130 is a three-phase busbar (see FIG. 3, below, for example) connected between a pair of opposing panels 110 at respective panel-busbar interfaces 132. Such a configuration provides enhanced mechanical strength and rigidity to the housing 100 without the need to provide additional structural support components. This enables a relatively light-weight housing 100 to be provided, particularly when used with an aluminium (or other light-weight conducting material) busbar 130 and one or more panels 110 made using composite materials. For example, one or more panels 110 may be constructed using carbon fiber, glass fiber, resins, etc. Such composite materials may also be provided with one or more conductive elements (e.g. wire grids, metallic particles, etc.) so as to provide electro-magnetic (EMC) screening within the enclosed space 150.

In various embodiments, the housing 100 is used for distributing primary power in an aircraft. The panels 110 can be designed so as to provide a naturally convection-cooled, light weight, compact design that physically and electrically protects component parts from mechanical loading and electrostatic discharge in order to meet a set of environmental conditions, such as, for example, those designated within DO160E. For example, respective of the panels may include various lower vents 112, upper vents 114 and/or side vents 116 to provide a predetermined airflow pattern effective to provide cooling within the housing 100. Wiring and external connections can also be provided through certain of the vents 112, 114, 116. Various or all of such vents 112, 114, 116 may additionally be screened to help prevent the ingress of foreign objects into the housing 100.

In one embodiment constructed and tested by the Applicant, the potential for the use of composite panels for primary power distribution was investigated. The volume packaging requirements for use in aircraft were found to lend themselves to the use of pre-impregnated materials (prepregs) and a manual lay-up process. The use of carbon composite materials in the panel design achieved a lightweight "monocoque" structure which was investigated to test the feasibility of replacing conversional fabricated, machined and riveted together aluminium components.

The panels 110 were assembled using pre-impregnated carbon fiber composite materials from the MTM® range supplied by the Advanced Composite Group Limited. A fiber reinforced composite material is a structural system comprising a matrix of one type of material, reinforced with a fibrous form of another material, in this instance the two constituents being epoxy resin and carbon fiber.

The MTM® 46 composite material selected had a mid-range performance level and was cured at a relatively low temperature (80° C.), without the requirement to use an autoclave. The MTM® 46 material was developed specifically for the production of high quality laminates using a low-pressure process. However whilst this specific embodiment used this particular material, in general the prepreg composition can be optimized for tailored mechanical and thermal performance, with high fiber content being achievable within the matrix if desired.

To produce the composite panels 110, prepreg material was laid up by hand into a female mould surface, vacuum bagged and then heated to 120° C. This allowed the resin to initially reflow and eventually to cure. The resin was near-solid at ambient temperatures, and the prepreg had a light sticky/tacky feel to it, which aided in the lay-up of the layers into the mould.

The lay-up consisted of seven layers of prepreg, with each layer being orientated at 45° with respect to the adjacent layer. For high-strength applications, fiber orientation may be designed to provide high strength aligned to the load conditions. The density of the panels 110, with a typical fiber volume of 50%, was around 1.51 grams/cubic centimeter (with the fiber density being 1.77 grams/cubic centimeter and the resin density 1.25 grams/cubic centimeter).

The panels 110 were used to provide a housing 100 with an enclosed space 150 having a height dimension (substantially equivalent to the longest dimension of the busbar 130) of 30 inches (about 75 cm), a width dimension of 20 inches (about 50 cm), and a depth dimension (defined along an axis perpendicular to the plane containing the busbar 130) of 10 inches (about 25 cm).

Figure 3:
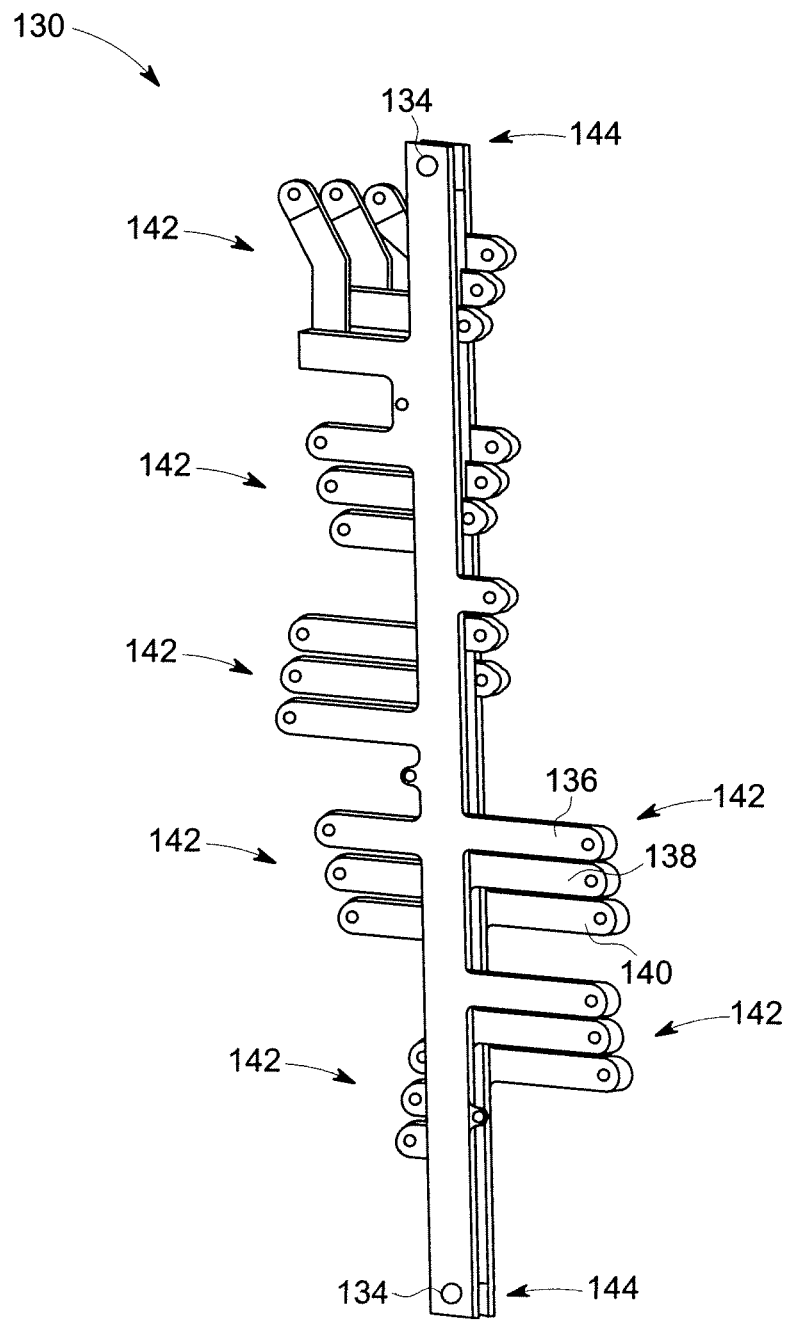
FIG. 3 shows a three-phase busbar for use in the housing of FIG. 2.

FIG. 3 shows a three-phase busbar 130 for use in the housing 100 shown in FIG. 2. The busbar 130 actually made is a high power busbar designed to be used to distribute primary high-tension (HT) power in an aircraft.

The busbar 130 is formed using a first conductor 136, a second conductor 138 and a third conductor 140 provided in a stacked arrangement. Respective conductors 136, 138, 140 are provided to distribute respective power phases of a three-phase delta power supply (not shown). The busbar 130 additionally provides mechanical reinforcement when installed in the housing 100.

The first conductor 136, second conductor 138 and third conductor 140 are made by powder coating respective aluminium cut-outs and firing them to form insulating coatings thereon. The powder coated conductors 136, 138, 140 are then interspersed with adhesively attached shaped thermosetting fiber-glass DELMAR sheets (not shown) and sandwiched together. Retaining bolts (not shown) may optionally or alternatively be used to secure the busbar 130 such that the conductors 136, 138, 140 remain spatially fixed with respect to each other. By powder coating the conductors 136, 138, 140 and separating them using mica, fiber-glass or other electrically-insulating sheeting, for example, a double-insulated busbar arrangement is provided.

The first conductor 136 and third conductor 140 are provided with mounting through-holes 134 at each end thereof. The second conductor 138 is dimensioned such that no part of it lies between the through-holes 134 of the first conductor 136 and third conductor 140 when they are aligned in the final assembled busbar 130. This arrangement thus provides a respective recess 144 at each end of the busbar 130 into which can be slotted a respective lip 146 formed on respective opposing panels 110. Such lips 146 can themselves be provided with though-holes that align with the respective through-holes 134 of the first conductor 136 and third conductor 140 to form a channel through which respective bolts (not shown) may be passed. The channels may be provided with respective insulating grommets (not shown) therein, and the bolts can be fixed in place using respective nuts (not shown) to provide the panel-busbar interfaces 132 for the housing 100. In this configuration the ends of the second conductor 138, nearest to the through-holes 134, preferably abut respective lips 146 so as to provide additional mechanical support.

Various transverse arms 142 are also provided on each respective conductor 136, 138, 140. These are preferably vertically staggered between each conductor 136, 138, 140, such that various electrical components may be connected to the various electrical phases without the need for complex wiring, while maintaining maximal physical separation between the wiring needed for each electrical phase. This thus helps minimize the chance that any wiring failures lead to a short circuit between the electrical power phases.

Busbars 130 may be made using a variety of conducting materials, such as copper for example. In an embodiment of the present invention, aluminium is used because, although a greater volume of material is required (compared to copper, for example), the Applicant has found that an overall weight reduction is obtained when providing the same power rating. Nevertheless, copper as a conductor may still be used in smaller housings where space requirements are an overriding factor.

A housing using composite materials and an aluminum busbar was manufactured, as described above. This was compared to a conventional housing having the same dimensions and using a copper busbar. (see FIG. 1 for example). Both designs met the requirements of DO160E, DO254 and ANSI C37.20.

The conventional housing weighed 11 kg compared to the embodiment which only weighed 3.6 kg. Since, typically, three such housings may be used in any one aircraft, using embodiments of the present invention can potentially save 22.2 kg or more per aircraft. Clearly this is advantageous from both fuel efficiency and emissions reduction points-of-view, particularly when considered over a long aircraft operating lifetime.

Additionally, various embodiments of the present invention have a simplified construction when compared to conventional electrical housings for aircraft. Furthermore, manufacture of the housings can be sped up as the need to drill various components, provide rivets, bolt parts together, etc. is reduced. The simplified construction of certain housing embodiments of the present invention is thus faster to produce as well as being lighter than conventional housings.

Those skilled in the art will also realize that numerous embodiments of the present invention may be provided. For example, panels could be provided as a single integrated structure rather than as a plurality of individual panels connected together. In certain embodiments, the housing may provide a monocoque or semi-monocoque structure. Various busbar-housing mechanical reinforcing arrangements may be provided.

The busbar may also be formed using a plurality of electrically separated electrically conductive elements or could include one single-phase conductive element. Such busbars may, if desired, be embedded wholly or partially in at least one of the panels in order to provide additional mechanical support for the housing. Additionally, whilst embodiments of a busbar have been described with reference to a three-phase busbar comprising three stacked plate-shaped generally flat/planar bars generally extending in a plane, and separated by insulating material, various alternative arrangements are possible. For example, single phase busbars having a variety of shapes may be used (e.g. rod-shaped, planar, etc). Such busbars may be selected or designed according to the power requirements for the housing, which may be high. High voltage, high tension and/or high current busbars may be provided, e.g. delivering AC and/or DC power at >100 volts, >30 amps, or >3 kW. The term high power busbar may be construed as a busbar system that delivers the power of higher than 3 kW. For example, various three-phase star or delta configurations, three-phase AC 415 volts/400 Amps per phase, three-phase 270 volts, single phase 270 or 450 volts AC, 270 volts DC, etc. supplies may be used.

Additionally, although embodiments of the invention have been described in relation to composite materials, those skilled in the art would realize that traditional manufacturing methods for production of, for example, standard primary power distribution enclosures consisting of a sheet metal aluminium enclosure reinforced with machined brackets may also be used. Such enclosures may be provided to exploit the advantages inherent in the manufacturing material properties such as, for example, mechanical strength, thermal conduction properties, EMC protection, etc. Moreover various materials having reduced alloy density (e.g. sintered materials) and/or novel structural concepts could also be used to provide embodiments in accordance with the present invention.

What is claimed is:

1. A housing for housing electrical equipment in an aircraft, the housing comprising:
   one or more pairs of panels, each pair of panels provided as a respective parallel pair of panels that together define an enclosed space for housing electrical equipment in the aircraft, each panel of one pair of parallel panels having a receptive lip; and
   at least one electrical busbar having a receptive recess at each of end thereof and the at least one electrical busbar formed using a first conductor, a second conductor and a third conductor provided in stacked arrangement for providing electric power to the electrical equipment;
   wherein each receptive recess of the at least one electrical busbar is connected between the receptive lip of each panel of the one parallel pair of parallel panels to provide structural support for the housing; and
   wherein the enclosed space enclosed by the housing has a height dimension of from 50 cm to 150 cm, a width dimension of from 40 cm to 150 cm and a depth dimension of from 10 cm to 50 cm.

2. The housing of claim 1, wherein the one or more pairs of panels are made of composite material.

3. The housing of claim 1, wherein the at least one electrical busbar comprises one or more of copper and aluminum.

4. The housing of claim 1, wherein the at least one electrical busbar is a high power busbar that delivers AC and/or DC power of greater than 100 volts and 30 amps.

5. The housing of claim 1, wherein the at least one electrical busbar is a three-phase busbar.

6. The housing of claim 5, wherein the three-phase busbar comprises three plate-shaped bars, each of the plate-shaped bars separated from another of the plate-shaped bars by insulating material.

7. The housing of claim 1, wherein at least one of the one or more pairs of panels incorporates one or more conductive elements so as to provide electromagnetic screening within the enclosed space.

8. The housing of claim 1, wherein at least one of the one or more pairs of panels provides a monocoque or semi-monocoque structure.

9. The housing of claim 1, wherein the at least one electrical busbar is embedded wholly or partially in at least one of the one or more panels.

* * * * *

UNITED STATES PATENT AND TRADEMARK OFFICE
CERTIFICATE OF CORRECTION

| | | |
|---|---|---|
| PATENT NO. | : 8,922,978 B2 | Page 1 of 1 |
| APPLICATION NO. | : 13/358856 | |
| DATED | : December 30, 2014 | |
| INVENTOR(S) | : Brett | |

It is certified that error appears in the above-identified patent and that said Letters Patent is hereby corrected as shown below:

In the specification,

Column 4, Line 48, delete "aluminum" and insert -- aluminium --, therefor.

In the claims,

Column 6, Line 44, in Claim 9, delete "panels." and insert -- pairs of panels. --, therefor.

Signed and Sealed this
Twenty-eighth Day of April, 2015

Michelle K. Lee
*Director of the United States Patent and Trademark Office*